United States Patent
Lee

(10) Patent No.: US 7,952,674 B2
(45) Date of Patent: May 31, 2011

(54) DISPLAY DEVICE HAVING COUNTER-TWISTING LIQUID CRYSTAL AREAS AND METHOD OF OPERATING AND MANUFACTURING THE SAME

(75) Inventor: Chang-hun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/773,527

(22) Filed: May 4, 2010

(65) Prior Publication Data

US 2010/0214502 A1 Aug. 26, 2010

Related U.S. Application Data

(62) Division of application No. 11/753,367, filed on May 24, 2007, now Pat. No. 7,738,066.

(30) Foreign Application Priority Data

Aug. 10, 2006 (KR) ........................ 10-2006-0075843

(51) Int. Cl.
  *G02F 1/1343* (2006.01)
  *G02F 1/13* (2006.01)
  *G02F 1/133* (2006.01)
  *G02F 1/1337* (2006.01)

(52) U.S. Cl. ............ 349/141; 349/38; 349/43; 349/126; 349/144

(58) Field of Classification Search .................... None
  See application file for complete search history.

(56) References Cited

U.S. PATENT DOCUMENTS

| | | | | |
|---|---|---|---|---|
| 5,801,796 | A | * | 9/1998 | Lowe .............................. 349/73 |
| 6,094,244 | A | * | 7/2000 | Kawata et al. .................. 349/74 |
| 6,118,422 | A | * | 9/2000 | Hiroshima et al. ............. 345/94 |
| 7,575,787 | B2 | * | 8/2009 | Nose et al. ..................... 428/1.1 |
| 2004/0195574 | A1 | | 10/2004 | Ahn et al. |

* cited by examiner

*Primary Examiner* — Tina M Wong
(74) *Attorney, Agent, or Firm* — Innovation Counsel LLP

(57) ABSTRACT

A display apparatus, includes: a first substrate; a gate line formed over the first substrate; a data line traversing the gate line, and comprising a source electrode; a drain electrode facing the source electrode to define a channel area; a passivation layer formed over the data line and the drain electrode, and comprising an organic material; a pixel electrode formed over the passivation layer, and comprising a first stem electrode, at least a part of which is overlapped with the gate line or the data line, and a plurality of first branch electrodes contacted to the first stem electrode where one set of the first branch electrodes extend longitudinally in a direction different from the longitudinal extension direction of another set of the first branch electrodes so as to thereby cause opposed twisting of corresponding liquid crystal material.

5 Claims, 17 Drawing Sheets

DISPLAY DEVICE HAVING COUNTER-TWISTING LIQUID CRYSTAL AREAS AND METHOD OF OPERATING AND MANUFACTURING THE SAME

CROSS-REFERENCE TO RELATED APPLICATIONS

This application is a divisional of, and claims benefit of U.S. Ser. No. 11/753,367 filed May 24, 2007, where the latter claims priority from Korean Patent Application No. 2006-0075843, filed on Aug. 10, 2006, in the Korean Intellectual Property Office, where the disclosures of said US and Korean applications are both incorporated herein by reference in their entireties.

BACKGROUND

1. Field of Invention

Apparatuses and methods consistent with the present disclosure of invention relate to Liquid Crystal Display (LCD) devices and manufacturing methods therefor.

2. Description of Related Art

Generally, a liquid crystal display device is one of the most popular flat panel displays used for computer monitor applications and the like. An LCD device typically includes two display substrates formed as a sandwich with liquid crystal material interposed therebetween. Inwardly facing surfaces of the two display substrates have electric field generating electrodes disposed on them such as an array of pixel electrodes and a common electrode, and the liquid crystal material is inserted between the two display substrates. The liquid crystal material has a dielectric anisotropy characteristic that allows it to alter transmission of light therethrough as a function of an electric field applied across the material.

More specifically, the liquid crystal display device controls an alignment of liquid crystal molecules in the liquid crystal layer by supplying a control voltage between the field generating electrodes to thereby apply an electric field of desired intensity and/or polarity to the liquid crystal material to thereby effect a twisting of the liquid crystal material and to thus control polarization of light passing through the material, thereby displaying a desired image.

The twisted nematic (TN) type of liquid crystal material has been widely used. In the TN type of liquid crystal display, the field generating electrodes are disposed on the counter-facing inner surfaces of the two display substrates, respectively, and liquid crystal polarization directors are arranged in the device to encourage a normal twisting by 90° of light passing from the lower display substrate to the upper display substrate. This twisting in combination with polarization plates, prevents light from passing through, thus presenting a dark pixel area. Then, a twisting voltage is applied between the two field generating electrodes to change the normal liquid crystal polarization and allow light to pass through thus changing the dark pixel area into a lit one. However, the liquid crystal display device of this TN type tends to have a narrow viewing angle with poor image contrast when viewed from one side or another of the display rather than head on. Accordingly, a liquid crystal display of an IPS (in-plane switching) type or a PLS (plane to line switching) type has been developed as an alternative to the TN type.

However, in the conventional IPS type and the PLS type, since both of the two field generating electrodes are disposed on a single display substrate, light transmittance and image visibility become deteriorated.

SUMMARY

The present disclosure provides a display device has improved visibility and transmittance. According to one aspect of the present disclosure, a display device is provided with an improved aperture ratio.

A method in accordance with the disclosure causes liquid crystal material of a same pixel area to twist in opposed directions (i.e., clockwise and counterclockwise) so as to provide improved image contrasting when the image is viewed from one side or another of the display rather than head on. Thus, visibilty from different angles is improved.

In one embodiment, a display apparatus, comprises: a first substrate; a gate line formed over the first substrate; a data line traversing the gate line to define a pixel area, a pixel electrode formed in the pixel area to have electric field generating branch-electrodes extending in substantially different directions and a first stem-electrode joining the branch-electrodes together; a second substrate facing the first substrate; a common electrode formed over the second substrate, where the common electrode may comprise a plurality of second branch-electrodes overlapping the pixel area and extending in said substantially different directions where the second branch-electrodes are positioned to be interdigitated relative to the first branch-electrodes, and a second stem-electrode connecting the second branch-electrodes of the common electrode; and a liquid crystal layer interposed between the first substrate and the second substrate.

According to an exemplary embodiment, the display apparatus further comprises a first parallel alignment layer formed over the pixel electrode and rubbed in a first direction, and a second parallel alignment layer formed over the common electrode and rubbed in a second direction, wherein the first direction and the second direction substantially parallel each other, and are opposite to each other.

According to the exemplary embodiment, the first substrate further comprises a storage electrode for defining a storage capacitor, where at least a part of the storage electrode is overlapped with the pixel electrode.

According to the exemplary embodiment, the liquid crystal layer comprises a liquid crystal with a positive dielectric anisotropy, and the width of the first branch electrodes and the width of the second branch-electrodes are each smaller than about 6 µm. In one embodiment, an electrode gap between an upper set of first branch electrodes and a lower, differently directed set of first branch electrodes is about 20 µm to 40 µm.

According to another exemplary embodiment, the liquid crystal layer comprises a liquid crystal with a negative dielectric anisotropy, and the width of the first branch electrodes are each smaller than about 6 µm. In one such embodiment, an electrode gap between the upper first branch electrodes and the lower first branch electrodes is about 4 µm to 14 µm.

According to the exemplary embodiment, a lengthwise direction of rotation of the upper first branch electrodes has an angle of 0° to 30° clockwise with respect to a lengthwise direction of the gate line while the same angle is repeated counterclockwise for the lower first branch electrodes.

According to the exemplary embodiment, the upper and lower first branch electrodes are symmetrical with respect to the gate line.

Other aspects of the disclosure appear in the below detailed description.

BRIEF DESCRIPTION OF THE DRAWINGS

The above and/or other aspects of the present disclosure will become more readily appreciated from the following description of the exemplary embodiments, taken in conjunction with the accompany drawings, in which.

DETAILED DESCRIPTION

Figure 1:
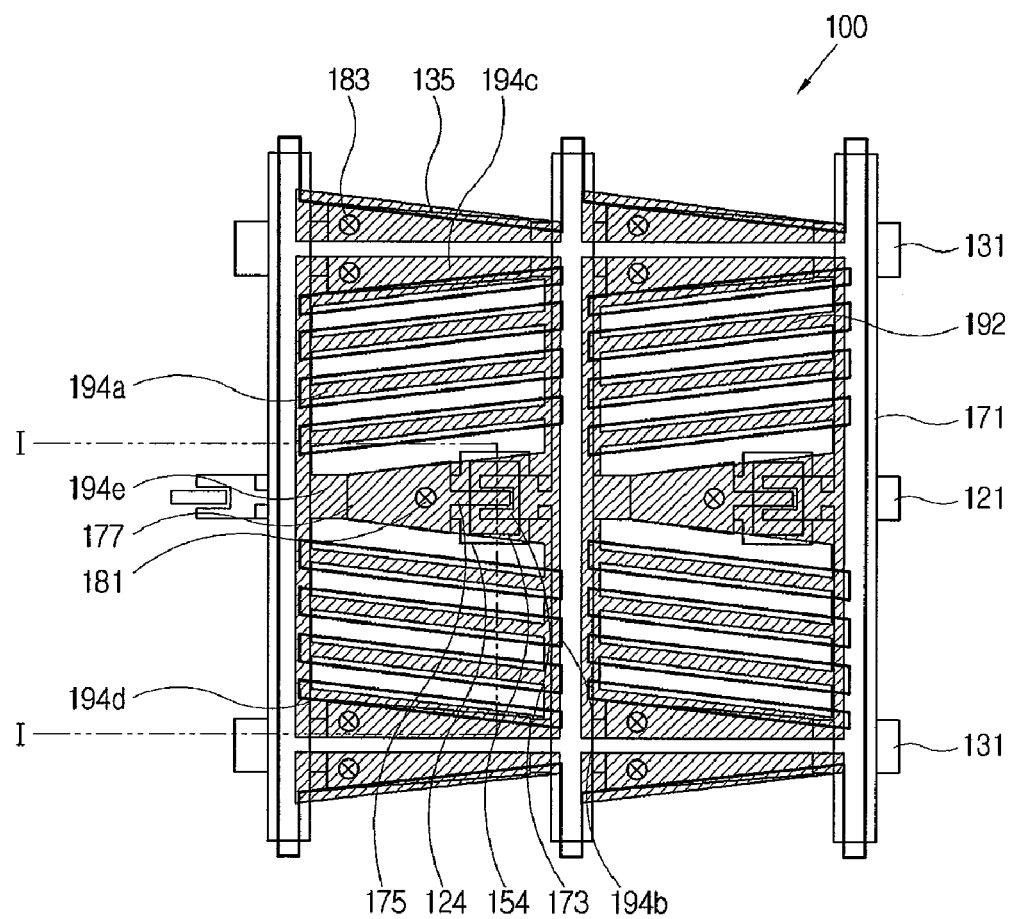
FIG. 1 is an arrangement diagram illustrating a configuration of a liquid crystal display device according to a first exemplary embodiment.

Reference will now be made in detail to exemplary embodiments in accordance with the present disclosure, where the examples are illustrated in the accompanying drawings, and wherein like reference numerals refer to like or similar elements throughout.

Hereinafter, a liquid crystal display device according to a first exemplary embodiment will be described by referring to FIGS. 1 to 4.

First, a thin film transistor (TFT) supporting substrate 100 having transparency will be described in detail by referring to FIGS. 1, 2 and 4.

The TFT-supporting substrate 100 comprises an insulating substrate 110 such as one made of a transparent glass and/or transparent plastics, and where a plurality of gate lines (GL's) 121 and a plurality of first storage electrodes (ST's) 131 are formed over the electrically insulating and optically transparent substrate 110.

Each gate line 121 (only one shown) transmits a corresponding gate signal to the gate terminals (124) of a corresponding row of TFT's (i.e., field effect transistors—two shown in FIGS. 1-2), and extends mainly in a transverse direction in the illustration. The gate line 121 includes an end part (not shown) widened for connection with an outer driving circuit and further widened at parts disposed at respective openings of an adjacent dielectric for connections to a plurality of gate electrodes 124 by way of extensions protruding upward and through vias to reach the other layers for connections thereto.

A gate driving circuit (not shown) is provided for generating the gate signal and it may comprise an integrated circuit (IC) chip mounted on a flexible printed circuit film (not shown) attached to the insulating substrate 110, or directly mounted on the insulating substrate 110 itself. Alternatively, the gate driving circuit may be directly formed integrally on the insulating substrate 110. If the gate driving circuit is directly formed on the insulating substrate 110, the gate line 121 may extend to be directly connected to the gate driving circuit.

A first storage electrode 131 is defined to oppose another electrode 135 and to thereby define a storage capacitor. The first storage electrode 131 extends on the TFT-supporting substrate 100 parallel to the gate line 121, in the horizontal or transverse direction of the illustration. The first storage electrode 131 defines a boundary of a pixel area (PA) together with a corresponding data line 171. That is, the first storage electrode 131 is formed around an upper edge of the pixel areas shown in FIG. 2 for example (two horizontally adjacent PA's shown). The first storage electrode 131 is formed between a first pixel area and its vertically adjacent pixel area (not shown). At least a part of the first storage electrode 131 is overlapped with a pixel electrode 191. The gate line 121 extends into the pixel area. For example, the gate line 121 extends into and through a central part of the pixel area, and divides the pixel area into two subareas.

A side of the first storage electrode 131 has an inclined angle of 0° to 30° with respect to a lengthwise direction of the gate line 121. The first storage electrode 131 has a symmetrical configuration with respect to an imaginary central line paralleling the gate line 121. For example, the first storage electrode 131 may have a symmetric trapezoidal shape, for example that mirroring the illustrated shape of storage electrode 135 in combination with stem electrode 194c. (See also FIG. 8.) Since the first storage electrode 131 is overlapped with the pixel electrode 191 (not shown) at an edge of the pixel area, undesirable leakage of light around an edge of the pixel electrode 191 can be prevented without need for a separate light intercepting member (i.e., a black masking matrix).

The first storage electrode 131 may be formed of (patterned from) the same conductive material layer used for forming the gate line 121. Also, the first storage electrode 131 receives a predetermined voltage such as a common reference voltage.

The gate line 121 and the first storage electrode 131 may be composed of an aluminum-based metal such as aluminum, an aluminum alloy, etc., or a silver-based metal such as silver, a silver alloy, etc., or a copper-based metal such as copper, a copper alloy, etc., a molybdenum series metal such as molybdenum, a molybdenum alloy, etc., and similarly for chrome, tantalum, titanium, etc.

The gate line 121 and the first storage electrode 131 may have a multi layer configuration comprising two conductive layers (not shown) with different physical properties. One of the conductive layers may comprise a metal having a relatively small resistivity such as an aluminum series metal, a silver series metal, a copper series metal, etc. to reduce a signal delay or a drop of voltage. The other of the conductive layers may comprise an interface material with a good physical, chemical and electrical contact properties relative to other materials, especially relative to ITO (indium tin oxide) and/or IZO (indium zinc oxide). The interface material may be one such as a molybdenum series metal, chrome, tantalum, titanium, etc. For example, a chrome lower layer and an aluminum (alloy) upper layer, and an aluminum (alloy) lower layer and a molybdenum (alloy) upper layer are applied thereto. However, the gate line 121 may comprise other various metals or electric conductors.

Over the gate line 121 and the first storage electrode 131, a gate insulating layer 140 is provided and it includes a dielectric such as a silicon nitride $SiN_x$, a silicon oxide $SiO_x$ or the like.

Over the gate insulating layer 140, a plurality of semiconductor islands 154 are provided and these may include hydrogenated amorphous silicon (referred to 'a-Si'), polysilicon or the like. The semiconductor islands 154 of respective TFT's overlap the corresponding gate electrode 124 of those transistors.

A plurality of ohmic island contact members 163 and 165 are formed over the island semiconductors 154. The ohmic island contact members 163 and 165 may comprise hydrogenated amorphous silicon densely doped as N+ with an n-type impurity such as phosphorus, or a silicide. The ohmic island contact members 163 and 165 are disposed to make a source/drain pair over the island semiconductors 154.

The ohmic island contact members 163 and 165 are disposed only between the island semiconductors 154, and the data line 171 and a drain electrode 175, and reduce a contact resistance therebetween. The island semiconductors 154 between the source electrode 173 and the drain electrode 175 define a non-metalized channel region. Also, the island semiconductors 154 have an exposed part not covered by the data line 171 and the drain electrode 175.

A plurality of data lines 171 and a plurality of drain electrodes 175 are formed over the ohmic island contact members 163 and 165 and the gate insulating layer 140. A plurality of second storage electrodes 135 are formed over the first storage electrode 131 and the gate insulating layer 140.

The data line 171 transmits a data signal, and extends mainly in a perpendicular direction to cross the gate line 121. The data line 171 includes first and second end parts (not shown) widened for connection with an outer driving circuit and further parts for coupling with a plurality of source electrodes 173 protruding upward and other layers, or for connection thereto. A data driving circuit (not shown) generating the data signal may be mounted on a flexible printed circuit film (not shown) attached on the insulating substrate 110, directly mounted on the insulating substrate 110 or directly integrated to the insulating substrate 110. If the data driving circuit is directly integrated onto the insulating substrate 110, the data line 171 may extend to be directly connected therewith.

The drain electrode 175 (see FIG. 4) is separated from the data line 171, and also spaced-apart from the source electrode 173 while centering over the gate electrode 124 and the corresponding, channel region 154. The drain electrode 175 includes a first end part 177 widened, and a second end part having a bar shape, and the second end part is surrounded by the source electrode 173 patterned in a U shape.

One gate electrode 124, one source electrode 173 and one drain electrode 175, together with the island semiconductor 154, compose one TFT (thin film transistor), and a channel of the TFT is formed to the island semiconductor 154 between the source electrode 173 and the drain electrode 175.

The second storage electrode 135 is formed in the same conductive material layer as that of the data line 171 and the drain electrode 175, and may include the same material as the data line 171 and the drain electrode 175. The second storage electrode 135 extends in a traverse direction to parallel the gate line 121, and is formed to an edge of a pixel area. The second storage electrode 135 according to the first exemplary embodiment of the present invention may be overlapped with the first storage electrode 131, and have the shape of an asymmetric half of a symmetrical trapezoid. A storage capacitance is formed in the region where the second storage electrode 135 and the first storage electrode 131 are overlapped with each other. Also, a storage capacitance may be further formed partially in the region where the second storage electrode 135 and the pixel electrode 191 are overlapped with each other.

In one embodiment, the data line 171, the drain electrode 175 and the second storage electrode 135 are fabricated so as to include a refractory metal such as molybdenum, chrome, tantalum and titanium, or alloys thereof, and to have a multi layer configuration comprising a refractory metal layer (not shown) and a conductive layer (not shown) of a smaller resistance. For example, a double layer including a chrome or a molybdenum (alloy) lower layer and an aluminum (alloy) upper layer, and a triple layer including a molybdenum (alloy) lower layer, an aluminum (alloy) middle layer and a molybdenum (alloy) upper layer are applied thereto. However, the data line 171, the drain line 175 and the second storage electrode 135 may include other various metals or electric conductors.

A passivation layer 180 (FIG. 4) is formed over the data line 171, the drain electrode 175, the second storage electrode 135 and the exposed part of the island semiconductor 154. The passivation layer 180 may include an organic insulating material with a relatively moderate dielectric constant, and have photo sensitivity. For example, the passivation layer 180 includes an organic insulating material of acryl series, and dielectric constant thereof may be 3 to 5. The dielectric constant thereof may be 3.4 to 4. Also, the passivation layer 180 has a thickness of approximately 2.5 μm to 5 μm. Alternatively, the passivation layer 180 has a thickness of approximately 3 μm.

Since the passivation layer 180 comprising an organic material over the data line 171 has a relatively small or moderate dielectric constant and is capable of being thickened, the data line 171 and the pixel electrode 191 can be sufficiently insulated from each other. Accordingly, interference between the data line 171 and the pixel electrode 191 can be reduced so that the pixel electrode 191 may be overlapped with the data line 171 or the gate line 121 rather than being forced to terminate at the position where the data line 171 or the gate line 121 begins. Accordingly, an aperture ratio can be improved because users can view a larger area of pixel electrode.

The passivation layer 180 may have a double layer configuration including an inorganic lower layer and an organic upper layer to prevent damage to the exposed part of the island semiconductor 154 with maintaining an excellent insulating property which an organic layer has. The inorganic lower layer may comprise silicon nitride SiNx or silicon oxide SiOx.

A plurality of contact holes 181 and 183 are formed through the passivation layer 180 to respectively expose the drain electrode 175 and the second storage electrode 135, and a contact hole (not shown) is formed through the passivation layer 180 to expose an end part (not shown) of the data line 171. Also, a plurality of contact holes (not shown) are formed through the passivation layer 180 and the gate insulating layer 140 to expose an end part (not shown) of the gate line 121. The contact hole 181 exposing the drain electrode 175 and the contact hole 183 exposing the second storage electrode 135 are electrically connected to the pixel electrode 191.

A plurality of pixel electrodes 191 are formed over the passivation layer 180. The pixel electrodes 191 may include a transparent conductive material such as ITO (indium tin oxide), IZO (indium zinc oxide) or the like.

The pixel electrode 191 includes a plurality of first branch electrodes 192 each having a predetermined angle to a lengthwise direction of the gate line 121. The plurality of first branch electrodes 192 are substantially parallel one another. Also, the pixel electrode 191 includes a plurality of first stem electrodes 194 contacting the plurality of first branch electrode 192.

The plurality of first branch electrodes 192 in a first exemplary embodiment have a symmetrical configuration with respect to the gate line 121 formed to a central part of the pixel area to be divided into an upper first branch electrode 192 and a lower first branch electrode 192'. A lengthwise direction of the first branch electrode 192 according to the first exemplary embodiment of the present invention may have an inclined angle of 0° to 30° with respect to a lengthwise direction of the gate line 121. The width of the first branch electrode 192 may be smaller than 6 µm. In one embodiment, the width of the first branch electrode 192 is about 4 µm. An electrode gap between the first branch electrode 192 and the first branch electrode 192 may be 20 µm to 40 µm. For example, the electrode gap therebetween may be 31 µm.

The first stem electrodes 194 connect the upper first branch electrodes 192 and the lower first branch electrodes 192'. The first stem electrode 194 according to the first exemplary embodiment includes a first part 194a, a second part 194b, a third part 194c, a fourth part 194d and a fifth part 194e. The first and the second parts 194a and 194b are respectively formed at edges of the pixel area, and parallel the data line 171. The first and the second parts 194a and 194b are overlapped with the data line 171. The third and the fourth parts 194c and 194d are respectively formed at edges of the pixel area, and include a first side paralleling the gate line 121 and a second side having a predetermined inclined angle with respect to a lengthwise direction of the gate line 121. For example, the third part 194c includes a side having an angle of 0° to 30° with respect to a lengthwise direction of the gate line 121, and the fourth part 194d includes a side having an angle of 0° to 30° with respect to a lengthwise direction of the gate line 121. The third and the fourth parts 194c and 194d are overlapped with the gate line 121 and the second storage electrode 135. The fifth part 194e is formed to a central part of the pixel area, and includes a first side paralleling the upper first branch electrode 192, and a second side paralleling the lower first branch electrode 192. The fifth part 194e may have a symmetric trapezoid shape.

Each pixel electrode 191 is physically and electrically connected with the drain electrode 175 of its corresponding TFT through the contact hole 181, and receives the charge from the drain electrode 175 so as to attain a desired voltage level relative to the common electrode. Also, the pixel electrode 191 fills the contact hole 183 exposing the second storage electrode 135 and supplies charge to the second storage electrode 135.

A first liquid crystal aligning layer 197 is formed over the pixel electrode 191. This alignment layer 197 according to the first exemplary embodiment may comprise a parallel type of liquid crystal aligning layer.

Figure 3:
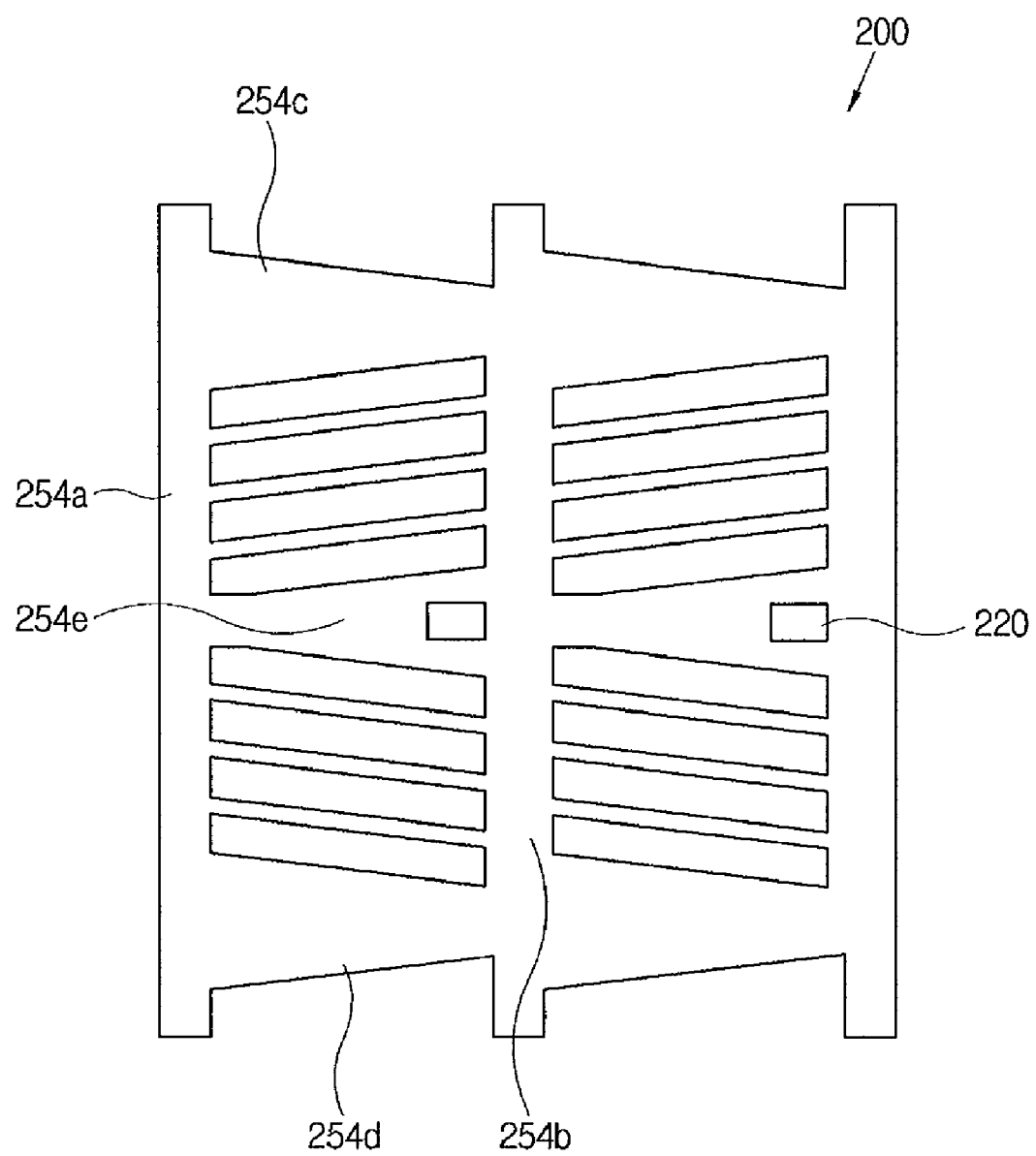
FIG. 3 is an arrangement diagram illustrating a configuration of a common electrode supporting substrate of the liquid crystal display device in FIG. 1.

Hereinafter, a common electrode supporting substrate 200 will be described by referring to FIGS. 1, 3 and 4.

As shown therein (see FIG. 4), the common electrode supporting substrate 200 includes an electrically-insulating and optically transparent substrate 210 composed of a transparent glass and/or transparent plastics or the like.

A light intercepting member 220 is formed over the insulating substrate 210. The light intercepting member 220 intercepts light leaking from the pixel area, and may include a first part corresponding to the gate line 121 or the data line 171, and a second part corresponding to a thin film transistor.

The light intercepting member 220 according to the first exemplary embodiment may be an island type corresponding to the thin film transistor. Accordingly, the data line 171 and the first storage electrode 131 can prevent a light leakage by applying an organic layer to the passivation layer 180 and superposing the pixel electrode 191 over the data line 171 and the first storage electrode 131. The shape of the light intercepting member 220 may be changed as deemed appropriate. Also, the light intercepting member 220 may be formed over the thin film transistor substrate 100. Here, the light intercepting member 220 may be formed to a layer between the passivation layer 180 and the pixel electrode 191, and may be provided to be an island type to cover the thin film transistor comprising the island semiconductor 154, the source electrode 173 and the drain electrode 175.

The common electrode supporting substrate 200 includes a plurality of color filters 230 and a planarizing layer 240. The color filter 230 includes one of primary colors of red, green and blue, and may extend in a vertical direction. The color filter 230 may be formed over the thin film transistor display substrate 100.

The planarizing layer 240 may include a (organic) insulating material, and prevents the color filter 230 from being exposed and supplies a planar surface. The planarizing layer 240 may be omitted if desired.

A common electrode 250 is formed over the planarizing layer 240. The common electrode 250 may include a transparent conductive material such as ITO, IZO, etc. The common electrode 250 (FIG. 3) includes a plurality of second branch electrodes 252 formed between the first branch electrodes 192 of the pixel electrode 191, and not overlapped with the first branch electrodes 192 of the pixel electrode 191. The second branch electrodes 252 may substantially parallel each other, and may substantially parallel the branch electrodes 192 of the pixel electrode 191.

The second branch electrodes 252 according to the first exemplary embodiment have a symmetrical configuration with respect to the gate line 121 formed to a central part of the pixel area to be divided into an upper second branch electrode 252 and a lower second branch electrode 252. A lengthwise direction of the second branch electrode 252 has an angle of 0° to 30° with respect to a lengthwise direction of the gate line 121. The width of the second branch electrode 252 may be smaller than 6 µm. In one embodiment, the width of the second branch electrode 252 may be about 4 µm. An electrode gap between the second branch electrodes 252 may be 20 µm to 40 µm. For example, the electrode gap between the second branch electrodes 252 may be 31 µm.

According to the first exemplary embodiment, the width of each of the first branch electrodes 192 ($d_1$) and the width of each of the second branch electrodes 252 ($d_2$) may be respectively about 4 µm, the electrode-to-electrode gap ($d_3$, $d_4$) between each of the first branch electrodes 192 may be about 31 µm and the electrode-to-electrode gap between each of the first branch electrodes 192 may be about 31 µm. Here, the second branch electrodes 252 may be formed between (interdigitated relative to) the first branch electrodes 192. Accordingly, a horizontal electrode-to-electrode gap ($d_5$) between one of the first branch electrodes 192 and the corresponding second branch electrode 252 may be about 13.5 µm. An opening 253 is formed between the second branch electrode 252 and the second branch electrode 252. The opening 253 may have a parallelogram shape, and a plurality of openings 253 parallel one another.

The common electrode 250 (FIG. 3) includes a second stem electrode 254 connecting the upper second branch electrodes 252 and the lower second branch electrodes 252'. Since a single layer excluding the opening part 253 is used as the common electrode 250, all remaining part of the common electrode 250 except the opening 253 and the second branch electrode 252 may define the second stem electrode 254.

The second stem electrode 254 according to the first exemplary embodiment includes a first part 254a, a second part 254b, a third part 254c, a fourth part 254d and a fifth part 254e. The first and the second parts 254a and 254b parallel the data line 171, and are overlapped with the data line 171. The third and the fourth parts 254c and 254d have shapes similar to the first storage electrode 131, and are overlapped with the first storage electrode 131. The fifth part 254e is formed to a central part of the pixel area, and includes a first side paralleling an upper area of the second branch electrode 252, and a second side paralleling a lower part of the second branch electrode 252. The fifth part 254e may have a trapezoid shape, and is overlapped with the second storage electrode 135.

The common electrode 250 receives a common reference voltage from the outside.

An upper liquid crystal aligning layer 260 is formed over the common voltage 250. The alignment layer 260 according to the first exemplary embodiment may comprise a parallel type alignment layer.

Figure 5:
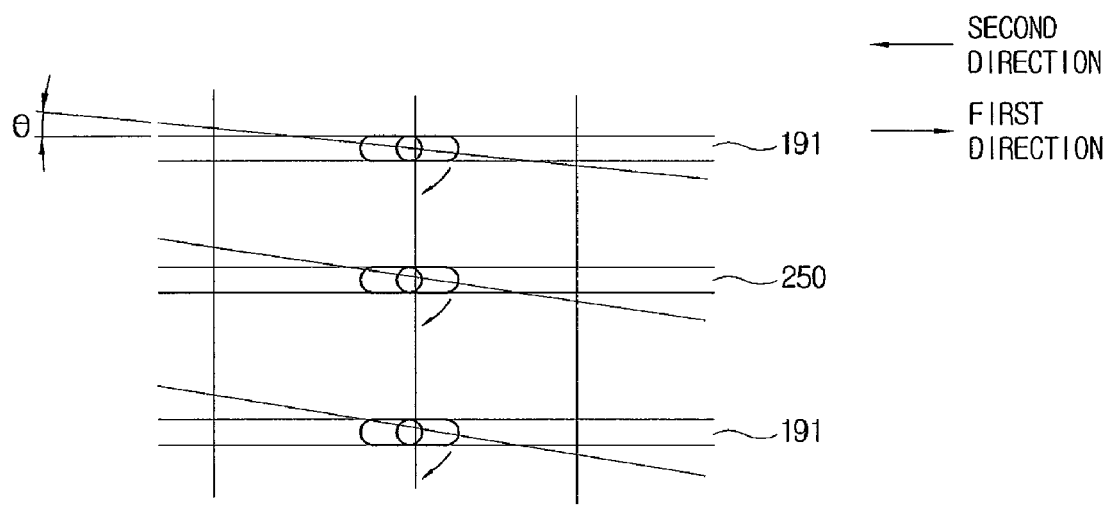
FIGS. 5 and 6 are sectional views illustrating arrangements of liquid crystal molecules in an operation of the liquid crystal display device according to the first exemplary embodiment.
Figure 6:
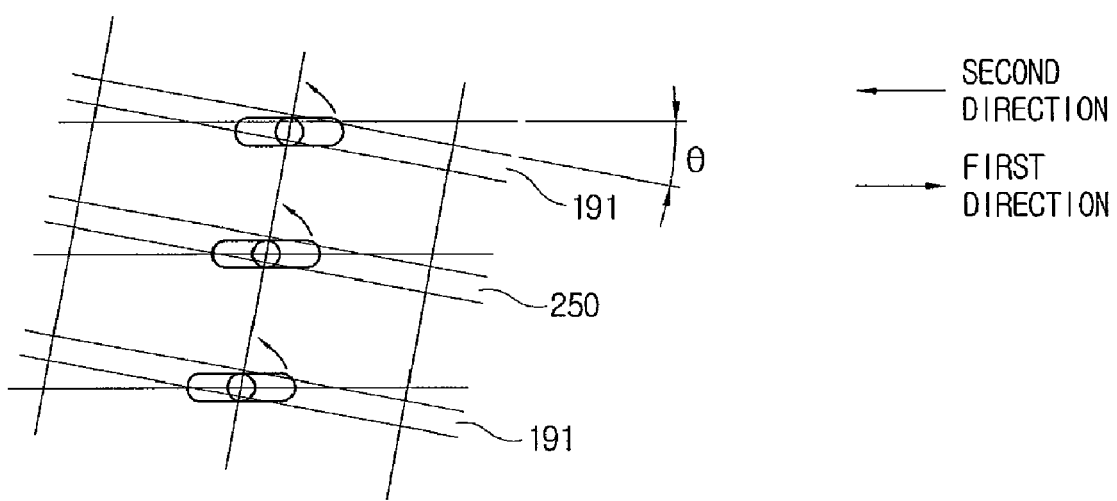

Hereinafter, an operation of a display device according to the first exemplary embodiment will be described by referring to FIGS. 1, 4, 5 and 6. FIGS. 5 and 6 are sectional views illustrating arrangements of liquid crystal molecules when a liquid crystal display device according to the first exemplary embodiment is operated.

The pixel electrode 191 receiving a data voltage generates an electric field together with the common electrode 250 receiving a common voltage, and determines a direction of orientation of liquid crystal molecules of the liquid crystal layer 300 positioned between both electrodes 191 and 250. Polarization of light transmitted through the liquid crystal layer 300 varies depending on the direction of orientation of the liquid crystal molecules.

The liquid crystal molecules of the liquid crystal display device according to the first exemplary embodiment have positive dielectric anisotropy. The alignment layer 197 of the thin film transistor display substrate 100 is rubbed in a first direction substantially paralleling the gate line 121, and the alignment layer 260 of the common electrode display substrate 200 is rubbed in a second direction paralleling the first direction and opposite to the first direction.

When a twisting voltage is not supplied, the liquid crystal molecules are aligned to be substantially parallel to surfaces of the substrates 110 and 210, and a major axis of the liquid crystal molecules substantially parallels the rubbed direction. The rubbed direction and the first branch electrodes 192 and the second branch electrodes 252 form a predetermined angle θ to each other as shown. Accordingly, the liquid crystal molecules are normally inclined at a predetermined first angle with respect to the first and the second branch electrodes 192 and 252 to have an initial twisted angle θ. The initial twisted angle is defined as an angle between the rubbed direction and a lengthwise direction of the branch electrodes, or an angle between the rubbed direction and the branch electrodes. The initial twisted angle is bigger than 0°, and equal to or smaller than about 30°.

Figure 4:
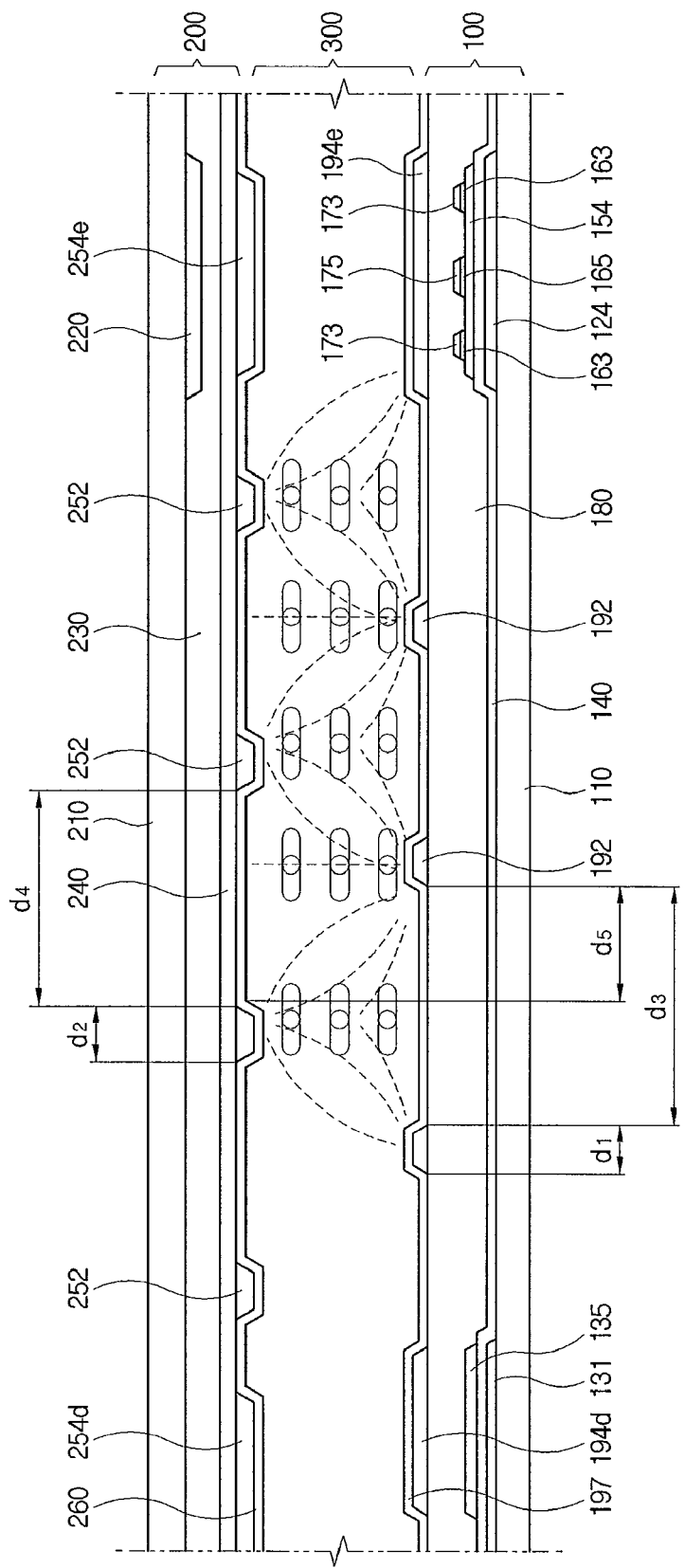
FIG. 4 is a sectional view taken along line I-I in FIG. 1.

Referring to FIG. 4, when a twisting voltage is supplied, an electric field is formed between the pixel electrode 191 and the common electrode 250. Flux lines of an electric field are formed between the first branch electrodes 192 of the pixel electrode 191 and the second branch electrodes 252 of the common electrode 250, and corresponding lateral field components and vertical field components are concurrently formed. Since the lateral field components prevail, the liquid crystal molecules rotate mainly on a plane paralleling the substrates to selectively display on and off states (light transmitting or not transmitting states or partial states in between).

An upper optical polarizing plate and a lower optical polarizing plate may be attached to the respective TFT and CE supporting substrates. Here, a transmission axis of the upper polarizing plate and a transmission axis of the lower polarizing plate may be perpendicular to each other. When a twisting voltage is not supplied, a polarizing direction of light transmitted through the liquid crystal is not changed by the liquid crystal material so that a dark state is displayed. When a twisting voltage is supplied, a polarizing direction of light transmitted through the liquid crystal is changed by the voltage-reoriented liquid crystal material so that a brightened state is displayed.

Referring to FIGS. 5 and 6, when a twisting voltage is supplied, liquid crystal molecules positioned to an area corresponding to the upper branch electrodes 192 and 252 rotate clockwise (FIG. 5) by the initial twisted angle, and liquid crystal molecules positioned to an area corresponding to the lower branch electrodes 192 and 252 rotate counterclockwise (FIG. 6) by the initial twisted angle. Accordingly, two side-by-side domains of light repolarization are formed, and visibility in a right-and-left direction can be improved.

Alternatively, liquid crystal molecules with a negative dielectric anisotropy may be used. Here, the liquid crystal molecules may be aligned in a vertical direction paralleling the data lines 171a and 171b. Also, the width of the first branch electrode 192 may be smaller than about 6 μm. The width of the first branch electrode 192 may be about 4 μm. Also, an electrode gap between the first branch electrode 192 and the first branch electrode 192 may be 4 μm to 14 μm, and may be 11 μM.

The width of the second branch electrode 252 may be smaller than 6 μm. In one embodiment, the width of the second branch electrode 252 is about 4 μm. Also, an electrode gap between the second branch electrode 252 and the second branch electrode 252 may be 4 μM to 14 μm. For example, the electrode gap therebetween may be 11 μm.

Alternatively, the width of the first branch electrode 192 and the width of the second branch electrode 252 may be respectively 4 μm and 4 μm, the electrode gap between the first branch electrode 192 and the first branch electrode 192 may be 11 μm, and the electrode gap between the second branch electrode 252 and the second branch electrode 252 may be 11 μm. Here, the second branch electrode 252 may be formed between the first branch electrodes 192. Accordingly, an electrode gap between the first branch electrode 192 and the second branch electrode 252 may be about 3.5 μm (equals 4.0 minus 0.5).

Hereinafter, a liquid crystal display device according to a second exemplary embodiment will be described by referring to FIG. 7.

Figure 7:
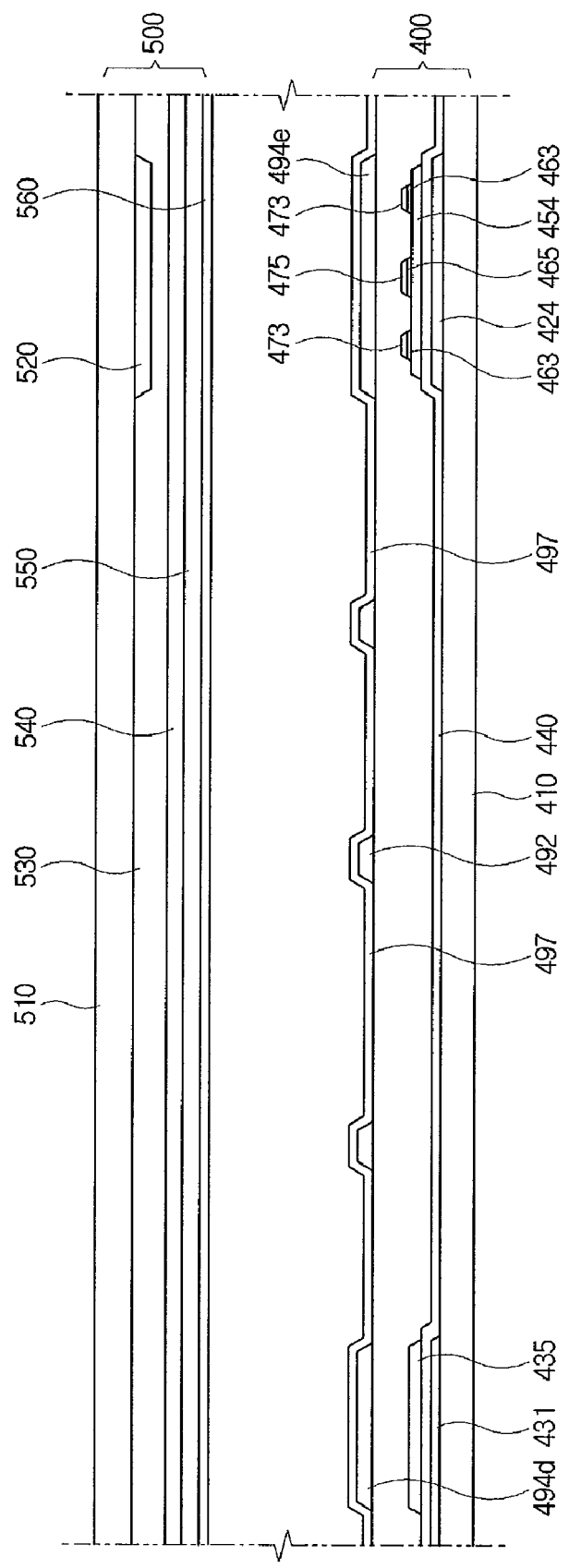
FIG. 7 is a sectional view illustrating a configuration of a liquid crystal display device according to a second exemplary embodiment.

FIG. 7 is a sectional view illustrating a configuration of a liquid crystal display device according to a second exemplary embodiment.

As shown in FIG. 7, a thin film transistor display substrate 400 of a liquid crystal display device according to a second exemplary embodiment has roughly the same configuration as the thin film transistor display substrate shown in FIGS. 1 to 6. However, the common electrode display substrate 500 according to the second exemplary embodiment has a different configuration. Hereinafter, a difference will be described.

The common electrode display substrate 500 includes an insulating substrate 510 including a transparent glass, plastics or the like. A light intercepting member 520 is formed to be an island type corresponding to a thin film transistor over the insulating substrate 510. The light intercepting member 520 may have various shapes as necessary. Also, the light intercepting member 520 may be formed over the thin film transistor display substrate 400. Here, the light intercepting member 520 may be formed to a layer between a passivation layer 480 and a pixel electrode 491, and may be provided to be an island type to cover the thin film transistor comprising a semiconductor 454, a source electrode 473 and a drain electrode 475.

The common electrode display substrate 200 includes a plurality of color filters 530 and a planarizing layer 540. The color filter 530 includes one of primary colors of red, green and blue, and may extend in a perpendicular direction. The color filter 530 may be formed over the thin film transistor display substrate 400.

A common electrode 550 is formed over the planarizing layer 540. The common electrode 550 according to the second exemplary embodiment of the present invention may be formed in a single planar shape without a pattern for forming an electric field. Accordingly, static electricity in the liquid crystal display device can be discharged through the common electrode 550 having the planar shape, thereby reducing a static electricity strain because there are no points of peaked field intensity.

An electric gap, an electrode width and a rubbed direction of the liquid crystal display device according to the second exemplary embodiment may have the same configurations as the liquid crystal display device shown in FIGS. 1 to 6.

Hereinafter, a manufacturing method of a thin film transistor according to a first exemplary embodiment will be described by referring to FIGS. 8 to 17.

Figure 2:
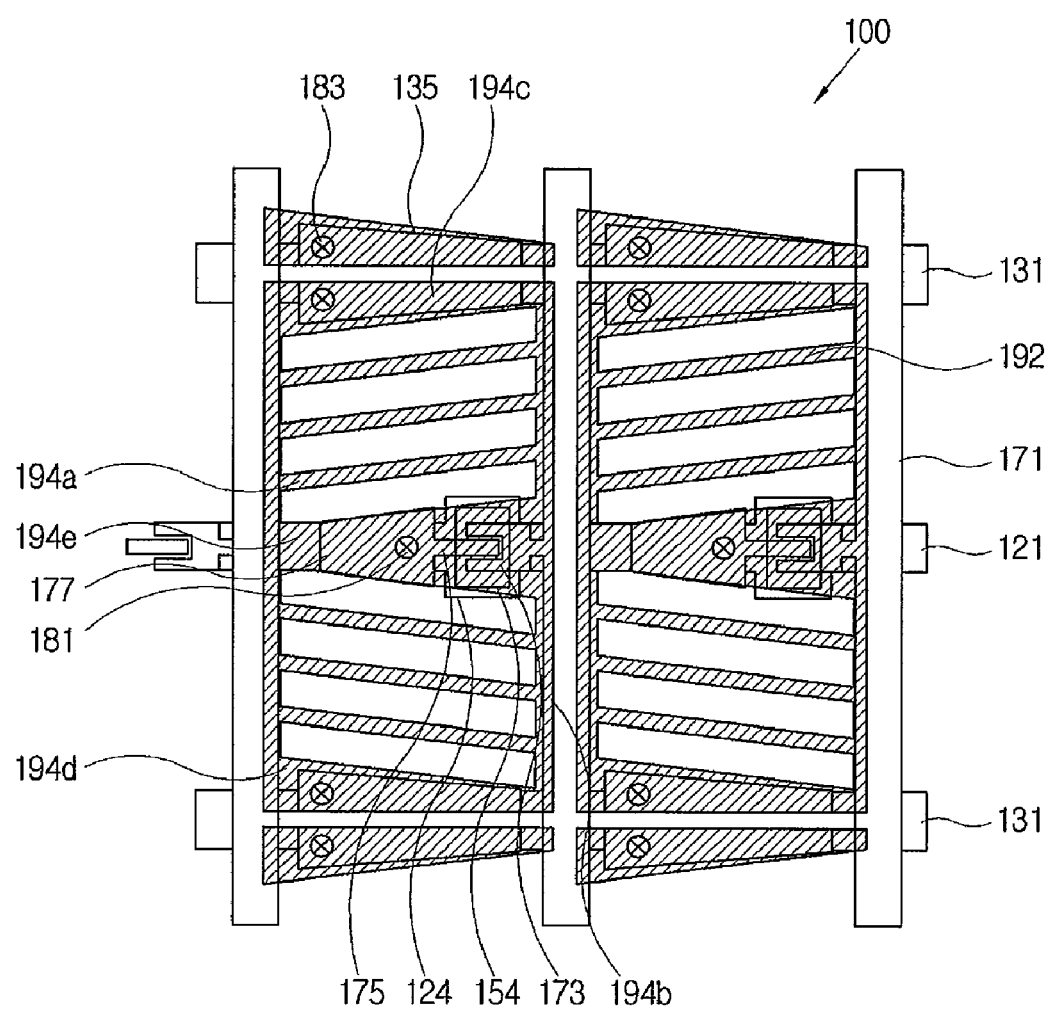
FIG. 2 is an arrangement diagram illustrating a configuration of a thin film transistor (TFT)-supporting substrate of the liquid crystal display device in FIG. 1.
Figure 8:
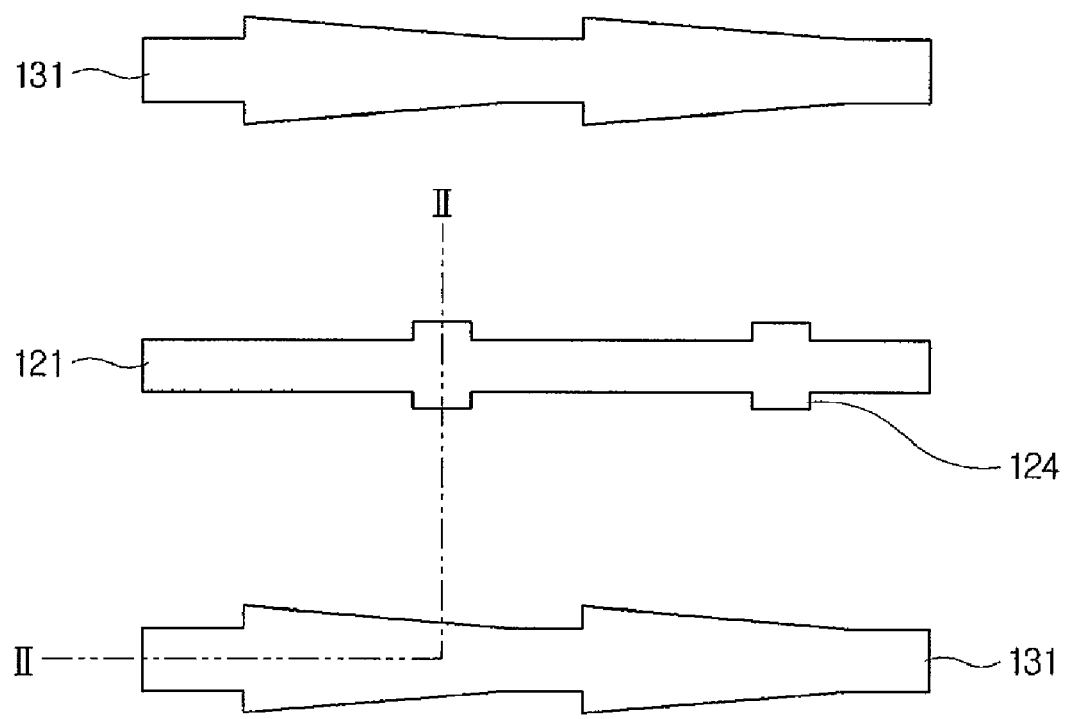
FIG. 8 is an arrangement diagram illustrating a first stage of a manufacturing method of a thin film transistor according to the first exemplary embodiment.
Figure 9:
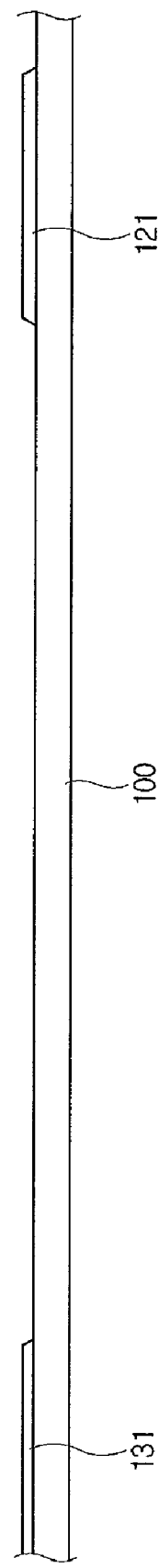
FIG. 9 is a sectional view taken along line II-II in FIG. 8.
Figure 10:
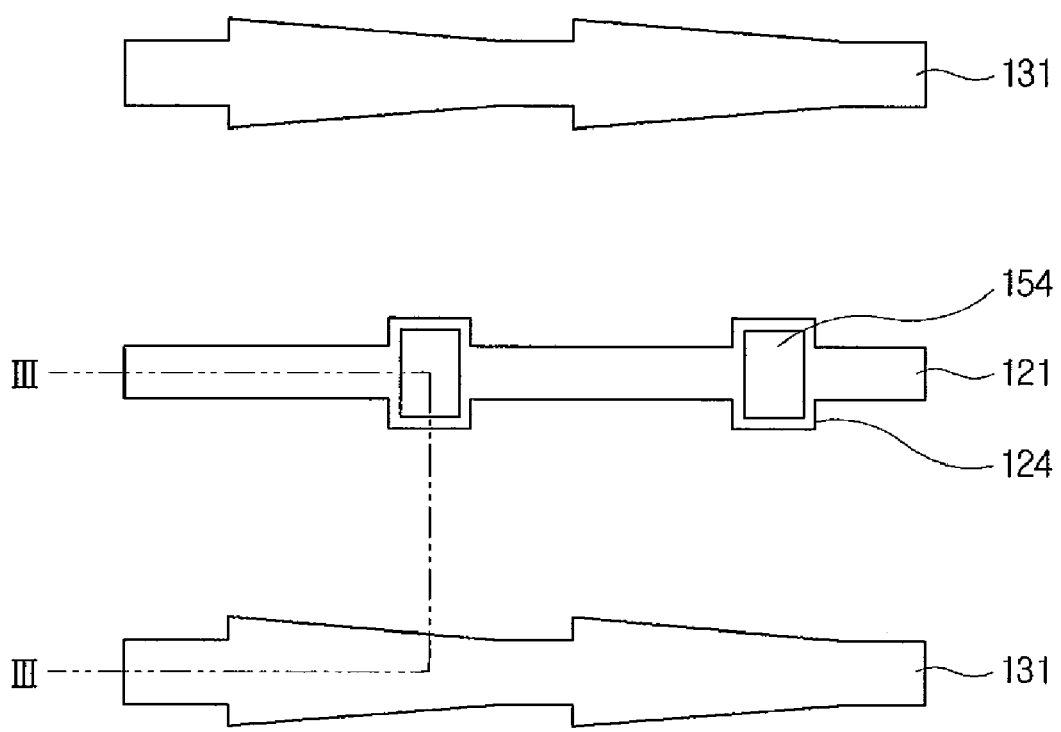
FIG. 10 is an arrangement diagram illustrating a second stage following the first stage in FIGS. 8 and 9.
Figure 11:
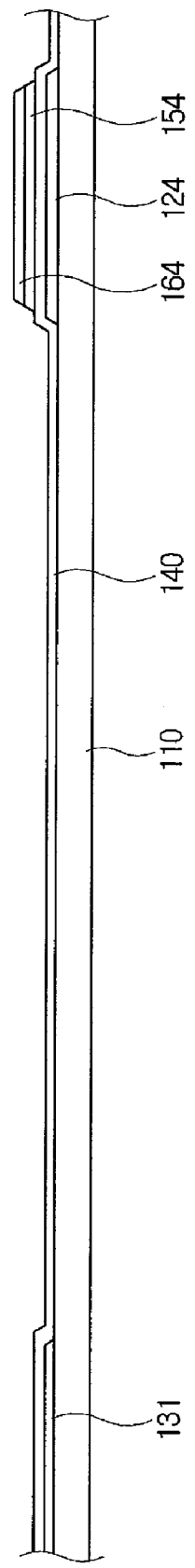
FIG. 11 is a sectional view taken along line III-III in FIG. 10.
Figure 12:
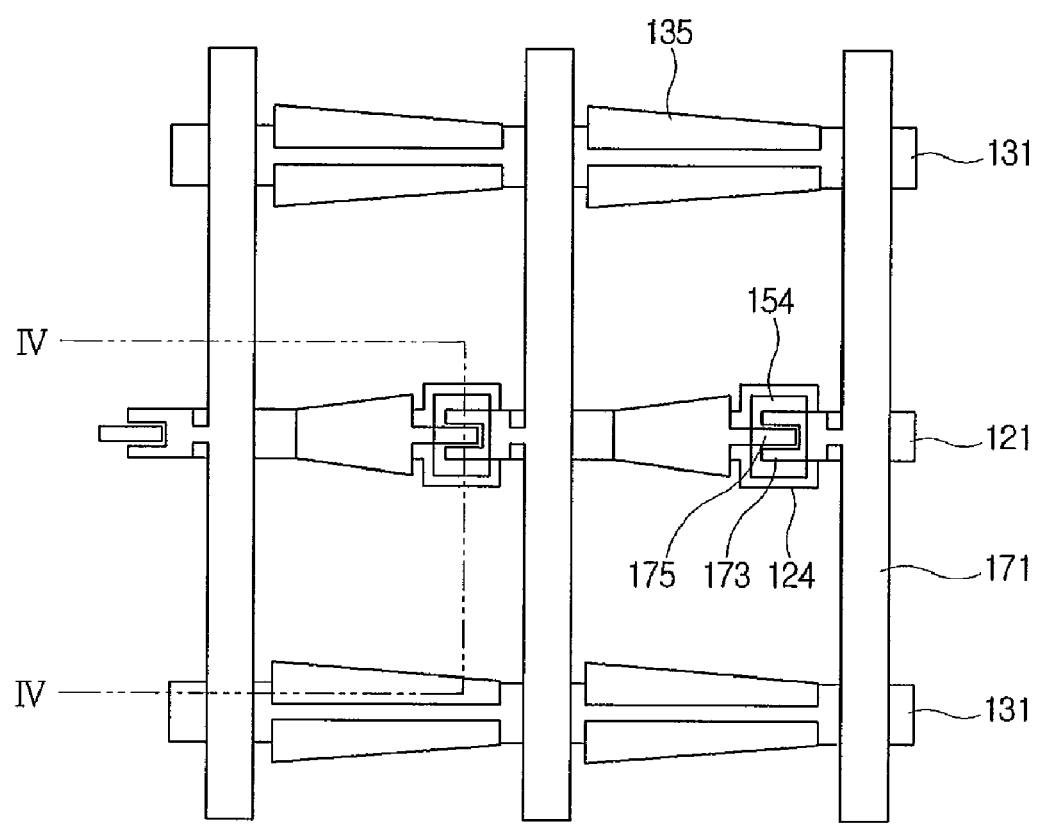
FIG. 12 is an arrangement diagram illustrating a third stage following the second stage in FIGS. 10 and 11.
Figure 13:
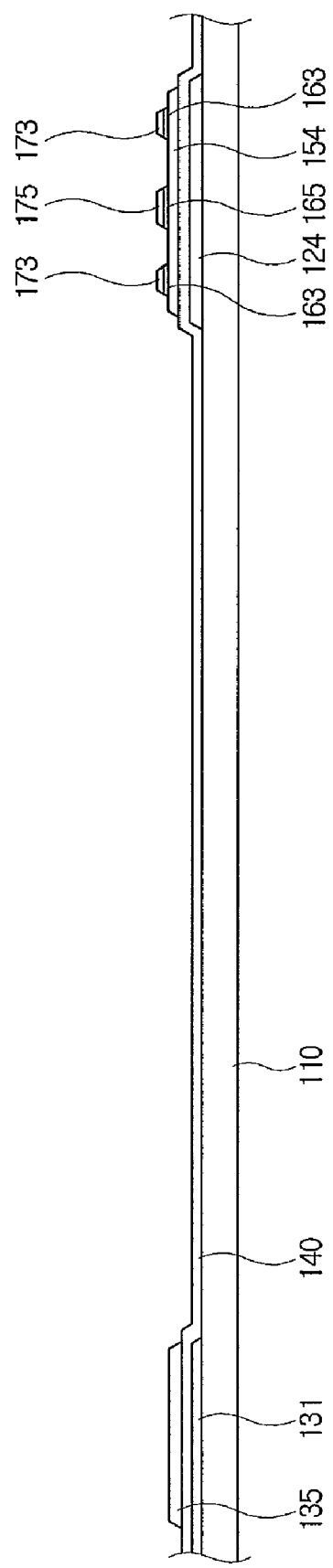
FIG. 13 is a sectional view taken along line IV-IV in FIG. 12.
Figure 14:
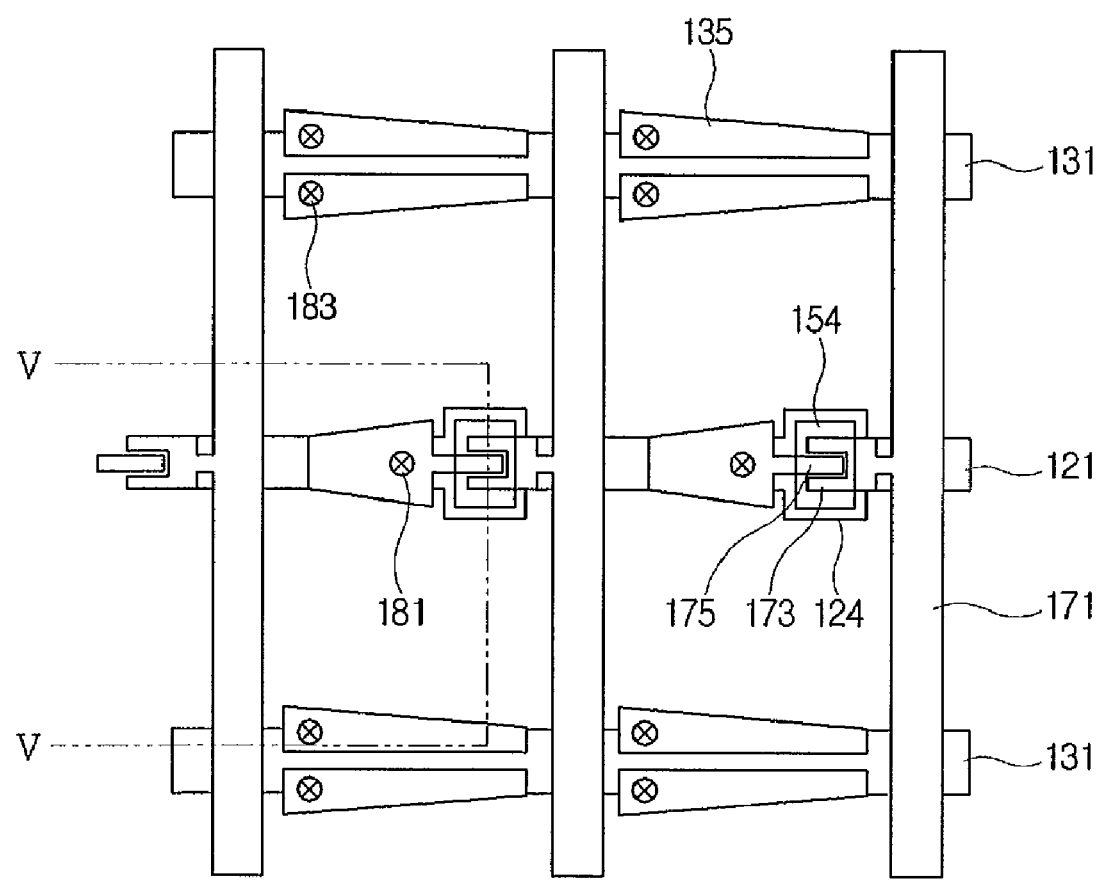
FIG. 14 is an arrangement diagram illustrating a fourth stage following the third stage in FIGS. 12 and 13.
Figure 15:
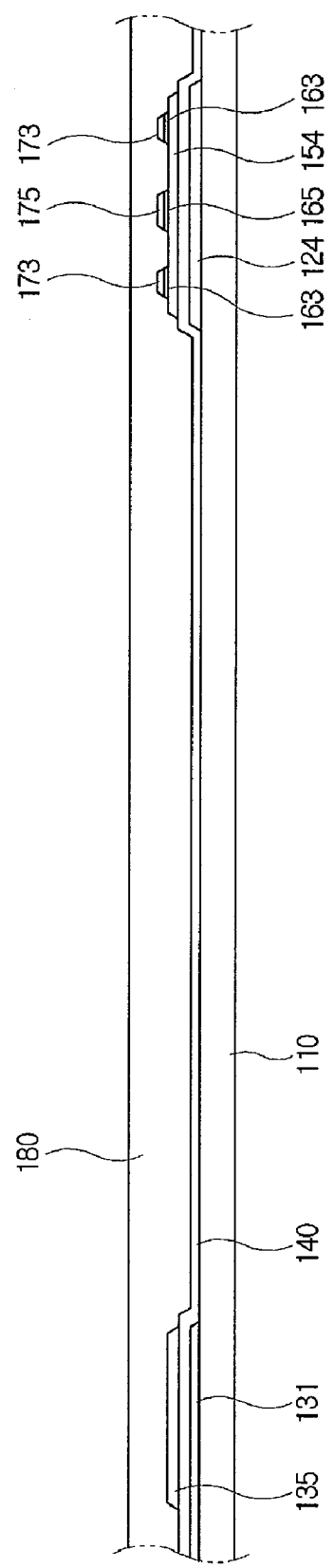
FIG. 15 is a sectional view taken along line V-V in FIG. 14.
Figure 16:
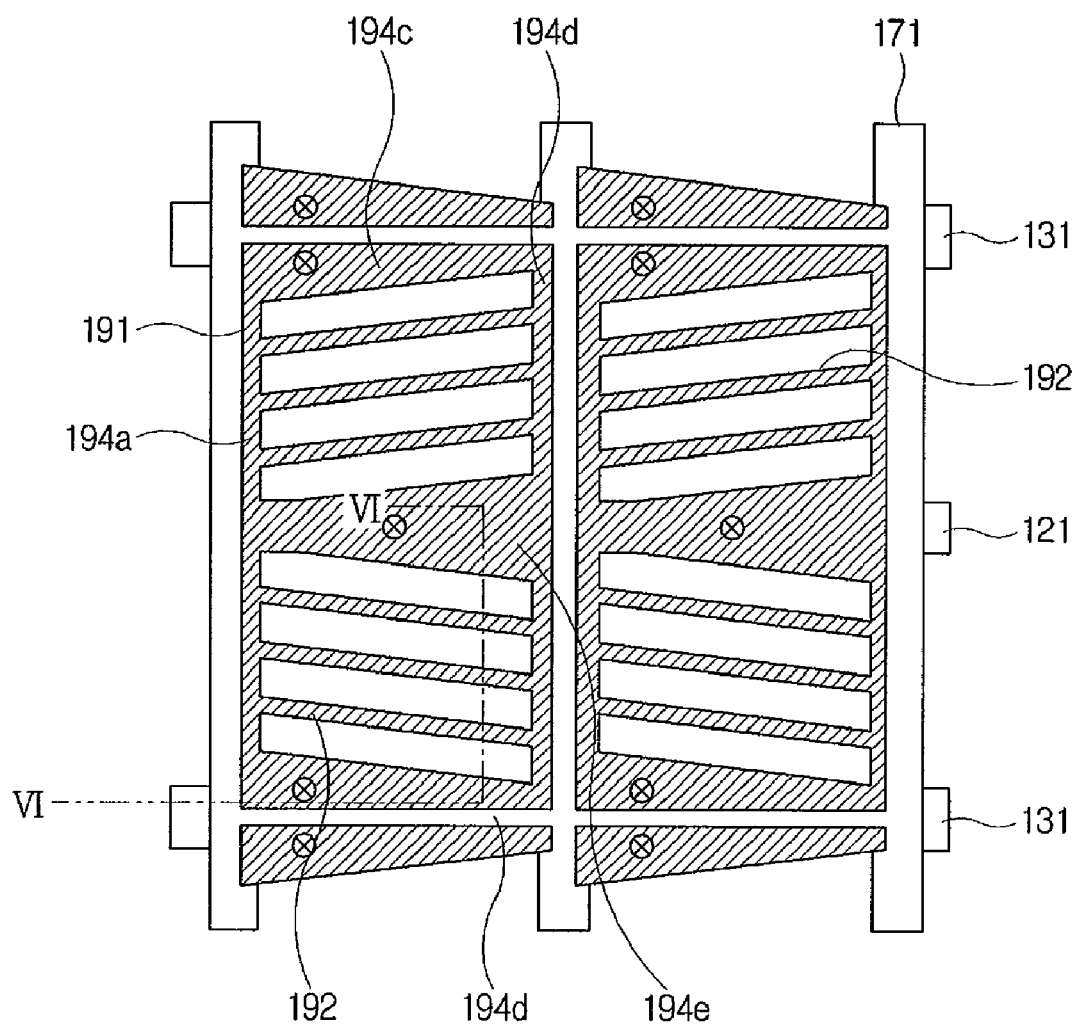
FIG. 16 is an arrangement diagram illustrating a fifth stage following the fourth stage in FIGS. 14 and 15.
Figure 17:
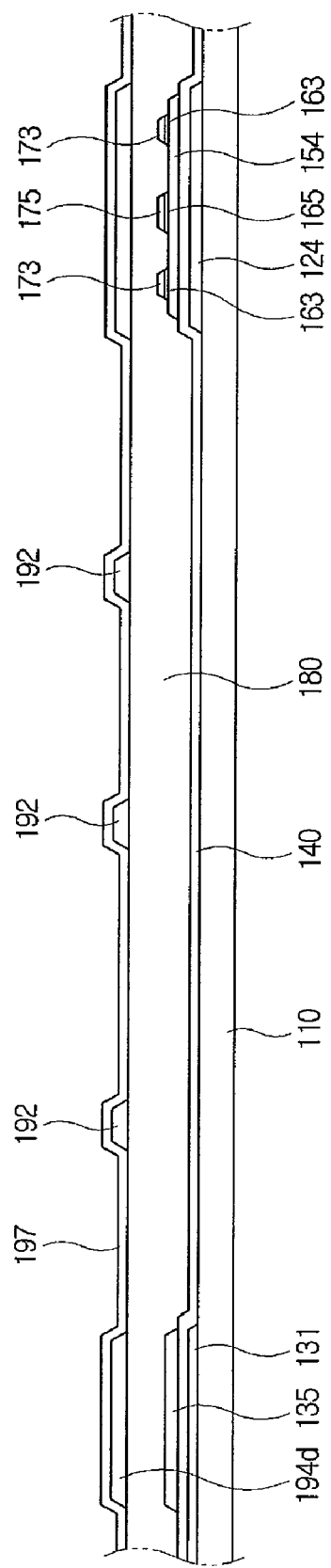
FIG. 17 is a sectional view taken along line VI-VI in FIG. 16.

FIG. 8 is an arrangement diagram illustrating a first stage of a manufacturing method of a thin film transistor according to a first exemplary embodiment of FIG. 1 where FIG. 9 is a sectional view taken along line II-II in FIG. 8, FIG. 10 is an arrangement diagram illustrating a second stage following the first stage in FIGS. 8 and 9, FIG. 11 is a sectional view taken along line III-III in FIG. 10, FIG. 12 is an arrangement diagram illustrating a third stage following the second stage in FIGS. 10 and 11, FIG. 13 is a sectional view taken along line IV-IV in FIG. 12, FIG. 14 is an arrangement diagram illustrating a fourth stage following the third stage in FIGS. 12 and 13, FIG. 15 is a sectional view taken along line V-V in FIG. 14, FIG. 16 is an arrangement diagram illustrating a fifth stage following the fourth stage in FIGS. 14 and 15, and FIG. 17 is a sectional view taken along line VI-VI in FIG. 16.

First, referring to FIGS. 8 and 9, a conductive material layer is formed (i.e., blanket deposited) over the insulating substrate 110 including a transparent glass, plastics or the like. Then, a plurality of gate lines 121 including the gate electrode 124, and a plurality of first storage electrodes 131 are lithographically formed by patterning with a dry etching method and/or a wet etching method.

The gate line 121 includes a metal layer, and may include a single layer or multi layers.

Then, referring to FIGS. 10 and 11, the gate insulating layer 140 including silicon nitride SiNx, an amorphous silicon (a-Si) layer (not shown), and a doped amorphous silicon layer (not shown) are formed over the gate line 121 and the first storage electrode 131. Then, the semiconductor 154 and the ohmic contact layer 164 are formed by dry-etching or wet-etching the amorphous silicon (a-Si) layer and the doped amorphous silicon layer Then, referring to FIGS. 12 and 13, a conductive layer is formed over the gate insulating layer 140 and the ohmic contact layer 164. Then, the data line 171 including the source electrode 173, the drain electrode 175 and the second storage electrode 135 are formed by dry-etching or wet-etching the conductive layer. Then, the ohmic contact layer 164 is patterned under the mask of the source electrode 173 and the drain electrode 175 to form the ohmic contact member 163 and 164. Accordingly, the semiconductor 154 is exposed between the source electrode 173 and the drain electrode 175, and the channel area is formed.

Then, referring to FIGS. 14 and 15, an organic insulating layer is coated over all surface of the substrate by a slit coating method or a spin coating method to form the passivation layer 180. Alternatively, to protect the exposed semiconductor 154, an inorganic insulating layer comprising silicon nitride SiNx may be deposited over all surface of the substrate by a chemical vapor deposition (CVD) before the organic insulating layer is formed. Then, a plurality of contact holes 181 and 183 are formed by etching the passivation layer 180 by a photo process.

Then, referring to FIGS. 16 and 17, a transparent conductive material such as ITO or IZO is deposited over the passivation layer 180 by a sputtering method, and then is patterned to form the pixel electrode 191. Here, the contact hole 181 on the drain electrode 175 is filled with the transparent conductive material to electrically connect the drain electrode 175 and the pixel electrode 191. Also, the contact hole 183 on the second storage electrode 135 is filled with the transparent conductive material to electrically connect the second storage electrode 135 and the pixel electrode 191. Then, the alignment layer is formed over the pixel electrode 191. Then, the alignment layer is rubbed in the first direction substantially paralleling the gate line 121.

The common electrode display substrate may be manufactured by a following method.

A light intercepting member is formed over an insulating substrate including a transparent glass and/or transparent plastic or the like. The light intercepting member may be formed in an island type corresponding to the thin film transistor.

The color filter having red, green and/or blue coloration attributes for example is formed over the light intercepting member. After coating the substrate with a photo sensitive material comprising dyes or pigment over, the photo sensitive material is patterned by a photo-lithography process to form the color filter. For example, a red color filter material is laminated over all substrate, and is exposed and developed to form a red color filter. A green color filter and a blue color filter are formed by the same method.

Then, the planarizing layer is further formed over the color filter. An (organic) insulating material is laminated over all substrate formed with the color filter to form the planarizing layer.

Then, the common electrode is formed over the planarizing layer. A transparent conductive material such as ITO or IZO is deposited over all substrate by a sputtering method, etc., and then is patterned to form the common electrode by a photo etching method. If the common electrode without a pattern for forming an electric field is formed, the patterning process may be unnecessary.

Then, the alignment layer is formed. Then, alignment layer is rubbed in the second direction paralleling the first direction and opposite thereto.

As described above, the embodiments provide a liquid crystal display device employing an organic insulating layer for a passivation layer, and overlapping a pixel electrode with a data line, thereby improving the aperture ratio.

Also, a gate line is disposed in a central part of a rectangular pixel area, a storage electrode is formed at an edge of the rectangular pixel area corresponding to a light leakage blocking part, and a first storage electrode and a second storage electrode are overlapped with each other to adjust an electric capacitance of a storage capacitor, said placement of the storage capacitor parts at the edges thereby preventing aperture ratio from being reduced due to the presence of the storage capacitor. As understood by practitioners, aperture ratio generally refers to the amount of light passed through the display panel when looking at it head-on as compared to the amount of light striking the panel from behind. Use of a black matrix with wide stripes can reduce the aperture ratio. Use of a pixel-electrode with an opaquely obstructed surface area can reduce the aperture ratio. Unlike the actual aperture ratio, the "apparent aperture ratio" may define the amount of image generating efficiency when viewing the display at an angle other than head on. The present disclosure provides for improvements of both the actual aperture ratio and the "apparent" aperture ratio.

Also, a data line, and first and second storage electrodes are formed to be overlapped with a light leaking area of a pixel electrode, thereby omitting a light intercepting member for an area in which the data line, and the first and second storage electrodes are formed.

Although a few exemplary embodiments have been shown and described, it will be appreciated by those skilled in the art after reading the present disclosure that changes may be made in these embodiments without departing from the principles and spirit of the disclosure.

What is claimed is:

1. A method of operating a liquid crystal display (LCD) having a liquid crystal layer shared by plural pixel areas and having different twist domain establishing members in each of the pixel areas, the method comprising:

selectively causing liquid crystal material disposed in the liquid crystal layer and belonging to a given one of the pixel areas to simultaneously twist in opposite directions so as to provide improved image contrasting when the image is viewed from one side or another of the display rather than head on, wherein a portion of the liquid crystal material of the liquid crystal layer and of the given one pixel area is initially aligned according to a predefined initial alignment line when no electric field is generated within the liquid crystal layer portion of the given one pixel area, and wherein the portion of the liquid crystal material of the given one pixel area is simultaneously twisted in said opposite directions relative to the initial alignment line when a twist inducing electric field is generated within the liquid crystal layer portion.

2. The method of claim 1 wherein said step of selectively causing causes the liquid crystal material in a first half of the given one pixel area to be selectively twisted in a clockwise direction relative to a predetermined frame of reference in response to application of a predetermined twisting voltage to the given one pixel area and causes the liquid crystal material in a second half of the given one pixel area to be selectively twisted counterclockwise in response to said application of the predetermined twisting voltage.

3. The method of claim 2 wherein the plural pixel areas are arranged as horizontal rows and vertical columns and said first and second halves of the each pixel area are disposed in a corresponding one or another of upper and lower halves of the corresponding row of the pixel area, thereby causing said clockwise and counterclockwise twisting to occur respectively in a corresponding one or another of upper and lower halves of the corresponding row.

4. The method of claim 1 wherein the liquid crystal display (LCD) includes an alignment layer adjacent to the liquid crystal layer and said predefined initial alignment line is defined by a rubbing direction of the alignment layer.

5. The method of claim 1 wherein the different twist domain establishing members in each pixel area include branch electrodes extending in different directions.

* * * * *